(12) United States Patent
Arasada (10) Patent No.: US 8,751,242 B2
(45) Date of Patent: Jun. 10, 2014

(54) SYSTEM AND METHOD FOR PROVIDING PRE-FLIGHT BRIEFING INFORMATION TO A USER DEVICE

(75) Inventor: Swathavahan Arasada, Andhrapradesh (IN)

(73) Assignee: Honeywell International Inc., Morristown, NJ (US)

( * ) Notice: Subject to any disclaimer, the term of this patent is extended or adjusted under 35 U.S.C. 154(b) by 1105 days.

(21) Appl. No.: 12/752,336

(22) Filed: Apr. 1, 2010

(65) Prior Publication Data

US 2011/0246176 A1 Oct. 6, 2011

(51) Int. Cl.
*G10L 21/00* (2013.01)
(52) U.S. Cl.
USPC ........................................... 704/275
(58) Field of Classification Search
USPC ........................................... 704/275
See application file for complete search history.

(56) References Cited

U.S. PATENT DOCUMENTS

| | | | |
|---|---|---|---|
| 5,999,882 A * | 12/1999 | Simpson et al. .................. | 702/3 |
| 7,535,381 B2 | 5/2009 | Marsh et al. | |
| 7,612,688 B1 | 11/2009 | Vigeant-Langlois et al. | |
| 2003/0093187 A1* | 5/2003 | Walker .............................. | 701/1 |
| 2003/0163232 A1* | 8/2003 | Moretto ........................... | 701/3 |
| 2004/0102956 A1 | 5/2004 | Levin | |
| 2004/0210847 A1* | 10/2004 | Berson et al. ................. | 715/788 |
| 2004/0230637 A1* | 11/2004 | Lecoueche et al. ............ | 709/200 |
| 2007/0061333 A1* | 3/2007 | Ramer et al. .................... | 707/10 |
| 2009/0265056 A1 | 10/2009 | Yukawa et al. | |

FOREIGN PATENT DOCUMENTS

| | | |
|---|---|---|
| EP | 1701508 A1 | 9/2006 |
| EP | 1855439 A2 | 11/2007 |
| EP | 1855439 A3 | 2/2010 |
| JP | 08096151 | 4/1996 |
| JP | 11353600 | 12/1999 |

OTHER PUBLICATIONS

Fox, A. et al.; Adapting to Network and Client Variability via On-Demand Dynamic Distillation; ASPLOS VII Oct. 1996 MA, USA, pp. 160-170, XP000639230.
Goehler, D. et al.; Jeppesen Worldwide Electronic NOTAM Service; Englewood, CO, pp. 353-356.
EP Extended European Search Report, EP 11157241.8-2221 dated Jul. 20, 2011.

* cited by examiner

*Primary Examiner* — Michael N Opsasnick
(74) *Attorney, Agent, or Firm* — Ingrassia Fisher & Lorenz, P.C.

(57) ABSTRACT

An automated method and related system of providing pre-flight briefing information to a remote user device are presented here. The system receives, from the remote user device via a data communication network, a customized pre-flight briefing request that includes a user-specified presentation format, a user-specified language, and a user-specified geographic region. In response to receiving the customized pre-flight briefing request, at least one data source is interrogated to obtain pre-flight briefing data. The pre-flight briefing data is processed in accordance with the user-specified presentation format, the user-specified language, and the user-specified geographic region, resulting in processed pre-flight briefing data. The system generates at least one presentation file from the processed pre-flight briefing data, and provides the at least one presentation file to the remote user device.

17 Claims, 3 Drawing Sheets

SYSTEM AND METHOD FOR PROVIDING PRE-FLIGHT BRIEFING INFORMATION TO A USER DEVICE

TECHNICAL FIELD

Embodiments of the subject matter described herein relate generally to information systems utilized in the avionics, commercial aircraft, and aerospace industries. More particularly, embodiments of the subject matter relate to information systems utilized for pre-flight briefing of pilots and flight crew members.

BACKGROUND

Pre-flight briefings are mandatory for commercial airline pilots and business and general aviation pilots. A pre-flight briefing typically occurs well in advance of the actual flight, and before the pilot enters the cockpit of the aircraft. The pre-flight briefing provides the pilot with certain information prior to takeoff, such as the flight plan, flight altitudes, the anticipated weather, the departure and arrival runway layout, etc. Pre-flight briefing data may be collected from any number of disparate and independent sources, and these sources may be maintained and supported by different entities, regulatory bodies, companies, business units, and the like.

Traditional pre-flight briefing data is provided in a raw, encoded, or otherwise difficult to interpret format. For example, weather data might be provided using code words, special notation, alphanumeric characters, or in a format other than plain human-understandable text. Consequently, the person undergoing the pre-flight briefing may need the assistance of human experts, counselors, and/or reference documentation to fully understand and comprehend the pre-flight briefing data. For example, a pilot may need to consult handbooks, reference materials, or lookup tables in an attempt to decode and interpret the pre-flight briefing data. As another example, a pilot may need to communicate with human operators who are well versed in the special nomenclature and syntax used to convey the pre-flight briefing data. Reliance on reference material, supplemental documentation, and human experts, however, can be cumbersome, inconvenient, time consuming, and costly.

BRIEF SUMMARY

An exemplary embodiment of an automated method of providing pre-flight briefing information to a remote user device is provided. The method receives, from the remote user device via a data communication network, a customized pre-flight briefing request that includes a user-specified presentation format, a user-specified language, and a user-specified geographic region. In response to receiving the customized pre-flight briefing request, the method interrogates at least one data source to obtain pre-flight briefing data. The method continues by processing the pre-flight briefing data in accordance with the user-specified presentation format, the user-specified language, and the user-specified geographic region, resulting in processed pre-flight briefing data. The method also generates at least one presentation file from the processed pre-flight briefing data, and provides the at least one presentation file to the remote user device.

Also provided is an exemplary embodiment of an automated method of providing pre-flight briefing information at a remote user device. This method begins by generating, with the remote user device, a customized pre-flight briefing request that includes a user-specified presentation format, a user-specified language, and a user-specified geographic region. The method sends the customized pre-flight briefing request to a data processing system that processes the customized pre-flight briefing request and obtains pre-flight briefing data that satisfies the customized pre-flight briefing request. The method continues by receiving from the data processing center, in response to sending the customized pre-flight briefing request, at least one presentation file generated from the pre-flight briefing data, the at least one presentation file conveying content that is influenced by the user-specified presentation format, the user-specified language, or the user-specified geographic region.

An exemplary embodiment of a system that provides pre-flight briefing information to a remote user device is also provided. The system includes: a user device interface configured to receive, from the remote user device, a customized pre-flight briefing request that includes a user-specified presentation format, a user-specified language, and a user-specified geographic region; a data source interface configured to communicate with at least one source of pre-flight briefing data to obtain pre-flight briefing data in accordance with the customized pre-flight briefing request; and a processor coupled to the user device interface and to the data source interface. The processor is configured to generate at least one presentation file from the pre-flight briefing data, in a manner that is influenced by the user-specified presentation format, the user-specified language, or the user-specified geographic region.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The system and methods described here can be used to provide pre-flight briefing information to a user of a remote device (e.g., a cellular device, a laptop computer, a personal digital assistant) in an automated, efficient, and easy to understand manner. A practical embodiment of the system described here could be used to obtain, process, and format pre-flight briefing information such as weather data, notices to airmen (NOTAMs), flight plan data, runway analysis data, flight maintenance data, aircraft status data, and the like. The pre-flight briefing information is processed and formatted in accordance with user-specified parameters such as the user's language, a geographic region, a preferred presentation format (audio, text, graphics, video, etc.), and the like. Thus, the content associated with the pre-flight briefing can be delivered to the user in a customized manner that is easy for that particular user to interpret and understand.

Figure 1:
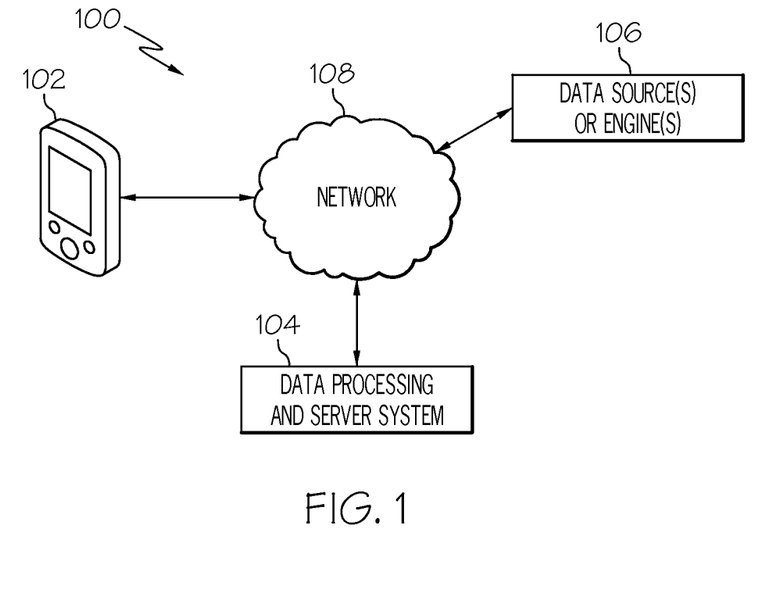
FIG. 1 is a schematic representation of an exemplary embodiment of a pre-flight briefing system.

Referring now to the drawings, FIG. 1 is a schematic representation of an exemplary embodiment of a pre-flight briefing system 100. It should be appreciated that FIG. 1 depicts a simplified embodiment of the system 100, and that a realistic and practical implementation of the system 100 may include additional elements or components. The illustrated embodiment includes, without limitation, a remote user device 102, a data processing and server system 104, and one or more data sources or engines 106. For the sake of simplicity and clarify, the following description may refer to a single data source 106. In practice, however, the system 100 may include any number of separate, physically distinct, and independent data sources and/or engines (where some or all may be co-located, and some or all may be remotely located relative to each other). The user device 102 is "remote" relative to the data processing and server system 104, relative to the data source 106, or relative to both. The remote user device 102, the data processing and server system 104, and the data source 106 may be communicatively coupled to one another via a suitable data communication network 108.

The data communication network 108 is any digital or other communications network capable of transmitting messages between senders and receivers (e.g., the remote user device 102, the data processing and server system 104, and the data sources 106). In practice, the data communication network 108 may include any number of physical, virtual, or logical components, including hardware, software, firmware, and/or processing logic configured to support data communication between an originating component and a destination component, where data communication is carried out in accordance with one or more designated communication protocols over one or more designated communication links. In this regard, a data communication link depicted in FIG. 1 may represent a single direct link (wireless or tangible) between two points or a plurality of links (wireless and/or tangible) that cooperate with one another to establish the desired path between two points.

Depending upon the embodiment, the data communication network 108 may include or cooperate with (without limitation): a local area network (LAN); a wireless local area network (WLAN); a wide area network (WAN) such as the Internet; a telecommunication services network (wireless or traditional); a personal area network (PAN); a cable or satellite television services network; a cellular communications network; or the like. Certain embodiments of the system 100 may also utilize one or more of the following for the data communication network 108 (without limitation): a pager network; a cordless telephone system; IEEE P1901 BPL (Broadband over Power Lines); a hospital data communication network (WMTS or other); a home network, such as a home control network, a home security system, or a home alarm system; or the like.

The remote user device 102 may be realized using any number of well known device or system platforms. Although not always required, certain embodiments of the system support a wireless remote user device 102, which may (but need not) be a mobile or a portable wireless device. Depending upon the particular embodiment, the remote user device 102 may be, without limitation: a monitor or display located in the flight deck of an aircraft; a portable computer, such as a laptop computer, a palmtop computer, or a tablet computer; a stationary computer, such as a desktop computer; a personal digital assistant; a smart phone; a wireless phone, such as a cellular phone or a cordless phone; a digital media player; a video game device; an electronic flight bag; or the like. Notably, the remote user device 102 may be suitably configured to display, render, play, or otherwise present pre-flight briefing information, data, and content in one or more formats (as long as those formats are supported and compatible with the native processing, display, rendering, and playback capabilities of the remote user device 102). For example, the remote user device 102 may be capable of displaying text-based documents, rendering graphical representations, playing audio content, and/or playing video content, depending upon its particular implementation and processing abilities.

The data processing and server system 104 may be associated with a centralized operations center, facility, or service that supports a plurality of remote user devices. For example, the data processing and server system 104 may be maintained, managed, and operated by a business entity, a government agency, an airport authority, or the like. The data processing and server system 104 may be realized using one or more computing devices, which may be co-located at one location or site or distributed among different locations or sites. If the data processing and server system 104 is implemented in a distributed fashion, then the distributed components may be communicatively coupled to one another using, for example, the data communication network 108 and/or using any appropriate interconnection architecture. For simplicity and clarity, the embodiment of the system 100 is described here with reference to a single data processing and server system 104. The data processing and server system 104 is suitably configured and arranged to support the various pre-flight briefing techniques, methodologies, and processes described below. Moreover, an exemplary embodiment of the data processing and server system 104 is described in more detail below with reference to FIG. 2.

Each data source 106 represents a source of pre-flight briefing data, and the system 100 could include or cooperate with any number of different data sources 106. A data source 106 could be associated with any application, service, software program, server, provider, etc. In certain embodiments of the system 100, the data processing and server system 104 is provided by, maintained by, and/or operated by one designated entity, agency, or company, while at least one data source 106 is provided by, maintained by, and/or operated by another designated entity, agency, or company. In other words, the data processing and server system 104 and the data source 106 need not be associated with the same entity, agency, or company. Moreover, a given data source 106 may be maintained, updated, and operated by any of the following types of entities, without limitation: a government agency; a municipality; an airport authority; a port authority; a commercial enterprise; a private enterprise; a public utility; an individual; an educational institution; a nonprofit organization; a service provider; an operator; or the like. It should be appreciated that a given data source 106 will be operated and maintained by an appropriate entity, considering the specific type of pre-flight briefing data provided by that particular data source 106. In this regard, the pre-flight briefing data provided by a data source 106 may include any of the following data, without limitation: flight plan data; equal time point (ETP) data; extended range twin engine operational performance standards (ETOPS) data; alternate route data; weather data; weather charts; airport location data; airport layout data; navigational aid (NAVAID) data; aircraft weight data; aircraft balance data; runway analysis data; notice to airmen (NOTAM) data; drift down data; ozone compliance data; temporary flight restriction (TFR) data; and receiver autonomous integrity monitoring (RAIM) prediction data. Accordingly, the data sources 106 that provide this pre-flight briefing data might be maintained, updated, and operated by the following entities, without limitation: (1) flight plan data may be provided by an appropriate system or service such as Skyplan; (2) ETP data may be provided by an appropriate system or service such as Skyplan; (3) ETOPS data may be provided by an appropriate system or service such as Skyplan; (4) alternate route data may be provided by an appropriate system or service such as Skyplan; (5) weather data and graphical weather information may be provided by an appropriate system or service such as Skyplan or the National Oceanic and Atmospheric Administration (NOAA); (6) airport location data and airport layout data may be provided by an appropriate system, service, or database product such as those available from AC-U-KWIK or Universal Weather and Aviation, Inc.; (7) NAVAID data may be provided by appropriate system or service such as Skyplan or one provided by Jeppesen; (8) aircraft weight and balance data may be provided by an appropriate system or service such as AGP or those provided by Automated Systems in Aircraft Performance, Inc.; (9) runway analysis data may be provided by an appropriate system or service such as those provided by Automated Systems in Aircraft Performance, Inc; (10) NOTAM data may be provided by an appropriate system, service, or agency, such as the FAA, the Defense Internet NOTAM Service, or Flight Explorer, Inc.; (11) TFR data may be provided by an appropriate system, service, or agency, such as the FAA; (12) RAIM prediction data may be provided by an appropriate system or service such as the service provided by DW International; (13) drift down data may be provided an appropriate system or service such Skyplan; and (14) ozone compliance data may be provided an appropriate system or service such Skyplan.

Each data source 106 provides its associated pre-flight briefing data in a predetermined or specified format, language, arrangement, etc. This description may refer to the pre-flight briefing data that originates at a data source 106 as "raw" data, "encoded" data, "original" data, or the like, to distinguish that data from processed pre-flight briefing data (the data processing and server system 104 generates such processed data from the raw, encoded, or original pre-flight briefing data). In this regard, the data sources 106 typically generate their pre-flight briefing data in a format or using syntax that is difficult to understand and interpret by humans without the assistance of expert consultants and/or reference documentation. The system 100 may leverage well known and existing data sources 106, and the specific manner in which the data sources 106 gather, generate, compile, format, and otherwise process their pre-flight briefing data will not be described in detail here.

Figure 2:
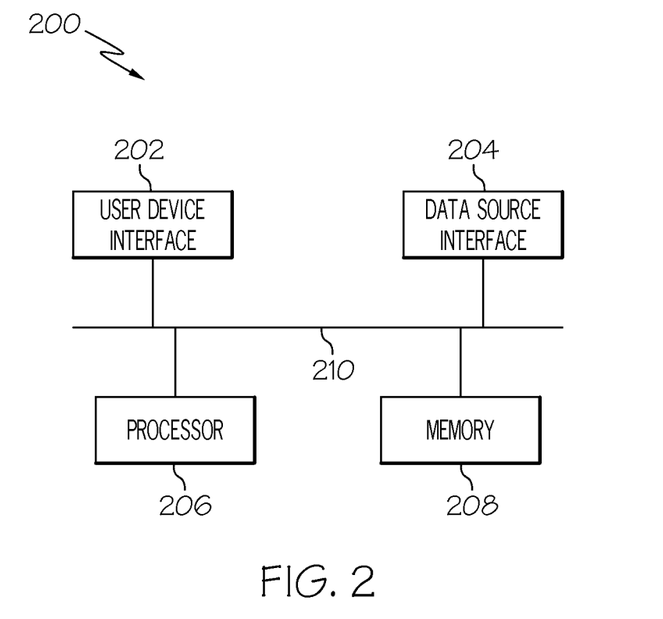
FIG. 2 is a schematic representation of an exemplary embodiment of a data processing and server system, which is suitable for use in the pre-flight briefing system shown in FIG. 1.

FIG. 2 is a schematic representation of an exemplary embodiment of a data processing and server system 200, which is suitable for use in the pre-flight briefing system 100. The data processing and server system 200 represents one exemplary embodiment of a system that provides pre-flight briefing information to remote user devices, such as the remote user device 102. FIG. 2 depicts a simplified representation of the data processing and server system 200, and an embodiment could include additional elements, logic, and/or software that supports conventional features and functions. This particular embodiment includes, without limitation: a user device interface 202; a data source interface 204; a processor 206; and an appropriate amount of memory 208. These components and elements may be coupled together as needed for purposes of interaction and communication using, for example, an appropriate interconnect arrangement or architecture 210.

The user device interface 202 represents the hardware, software, firmware, and/or processing logic that enables the data processing and server system 200 to communicate with remote user devices, such as the remote user device 102. In this regard, the user device interface 202 supports incoming data communication from one or more remote user devices, and supports outgoing data communication directed to one or more remote user devices. As explained in more detail below, the user device interface 202 is suitably configured to receive customized pre-flight briefing requests from remote user devices and, in response thereto, to transmit or otherwise provide access to at least one presentation file that conveys the requested pre-flight briefing content. Depending upon the embodiment, the user device interface 202 may support one or more wireless data communication protocols and/or one or more traditional (wired or tangible) data communication protocols.

The data source interface 204 represents the hardware, software, firmware, and/or processing logic that enables the data processing and server system 200 to communicate with data sources or engines, such as the data sources 106. In this regard, the data source interface 204 supports incoming data communication from one or more data sources or engines, and supports outgoing data communication directed to one or more data sources or engines. As explained in more detail below, the data source interface 204 is suitably configured to interrogate at least one data source or engine to obtain requested pre-flight briefing data for remote user devices. Depending upon the embodiment, the data source interface 204 may support one or more wireless data communication protocols and/or one or more traditional (wired or tangible) data communication protocols.

The processor 206 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 206 may be realized as a microprocessor, a controller, a microcontroller, or a state machine. Moreover, the processor 206 may be implemented as a combination of computing devices, e.g., a combination of a digital signal processor and a microprocessor, a plurality of microprocessors, one or more microprocessors in conjunction with a digital signal processor core, or any other such configuration.

The memory 208 may be realized as RAM memory, flash memory, EPROM memory, EEPROM memory, registers, a hard disk, a removable disk, or any other form of storage medium known in the art. The memory 208 can be coupled to the processor 206 such that the processor 206 can read information from, and write information to, the memory 208. In the alternative, the memory 208 may be integral to the processor 206. As an example, the processor 206 and the memory 208 may reside in a suitably designed ASIC.

The system 100 described here can be employed to process flight dispatch services and obtain pre-flight briefing data associated with weather, NOTAMs, flight plans, runway analyses, flight maintenance, aircraft disruptions, and other services for purposes of briefing the pilot or flight crew (prior to flight) using audio and/or synthetic visual information. The system 100 is particularly useful for scenarios when the pilot or user is located in a remote area with little to no modern infrastructure support such as a computer network, Internet access, etc. In practice, simple GSM connectivity or other cellular service could be used to support the system 100. A typical operating scenario will now be described with reference to FIG. 3 and FIG. 4.

Figure 3:
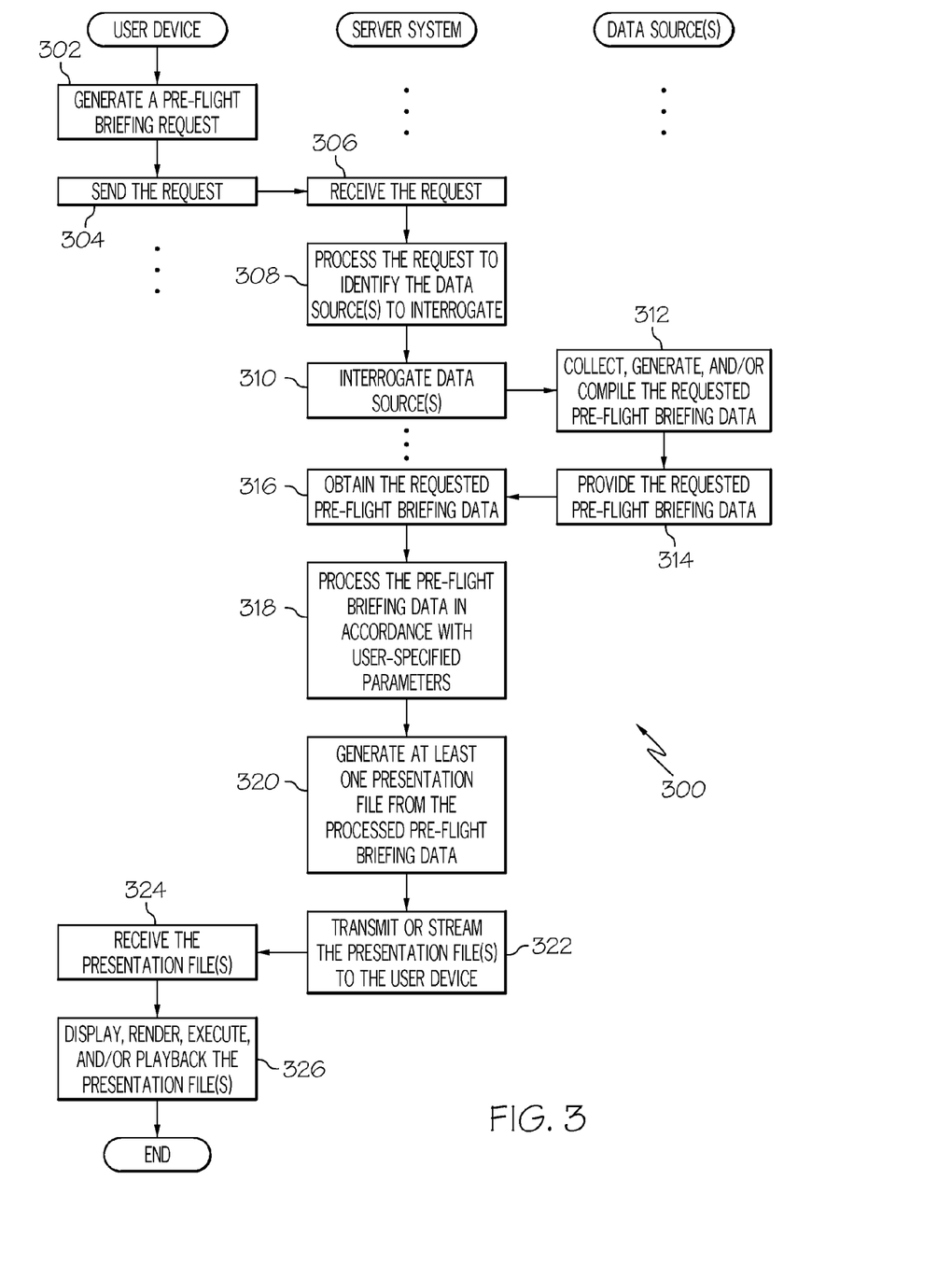
FIG. 3 is a flow chart that illustrates an exemplary embodiment of a pre-flight briefing process.

FIG. 3 is a flow chart that illustrates an exemplary embodiment of a pre-flight briefing process 300. The various tasks performed in connection with process 300 may be performed by software, hardware, firmware, or any combination thereof. For illustrative purposes, the following description of process 300 may refer to elements mentioned above in connection with FIG. 1 and FIG. 2. In practice, portions of process 300 may be performed by different elements of the described system, e.g., a remote user device, a server system, or a data source. Indeed, FIG. 3 depicts certain tasks that are performed by the user device (vertically aligned near the left side of FIG. 3), other tasks that are performed by the server system (vertically aligned near the center of FIG. 3), and yet other tasks that are performed by the data source(s) (vertically aligned near the right side of FIG. 3). It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The pre-flight briefing process 300 will usually be initiated by the pilot, a crew member, or other user well in advance of the actual flight. Indeed, process 300 could be performed at any time prior to the flight under consideration. This embodiment of process 300 begins with the remote user device generating an appropriately formatted pre-flight briefing request for the user (task 302). The pre-flight briefing request is electronically generated by the remote user device in response to some user interaction, commands, and/or input. For example, a pilot could enter a pre-flight briefing request for a particular itinerary using the user interface of the remote user device. The pre-flight briefing request might require some user-specified data, such as the source airport, the destination airport, the flight schedule, the flight number, an aircraft identifier or classifier, a customer speed policy, a fuel policy, or the like. Customized pre-flight briefing requests might also include other user-specified parameters or characteristics that influence the manner in which the pre-flight briefing system operates. For example, a pre-flight briefing request may include or otherwise indicate a user-specified presentation format, a user-specified language, and/or a user-specified geographic region. The user-specified presentation format specifies the manner in which the pre-flight briefing information will be conveyed or presented to the user. Depending upon the particular embodiment, user-specified presentation formats may include, without limitation: a text only format; an audio only format; a graphical representation format; a video only format; an audiovisual format; a streaming media format; an executable file format; a synthetic visual format; an email format; a text message format; a voicemail message format; etc. Thus, the user-specified presentation format allows the user to select one or more desired presentation formats to be used. The user-specified language specifies a language to be used when conveying the pre-flight briefing information. Accordingly, the user-specified language might influence text content, audio content, or both. In practice, the process 300 could be designed to accommodate more than one selected language. The user-specified geographic region specifies one or more areas, countries, regions, territories, or boundaries that traditionally or usually follow certain established, standardized, or well-known conventions, protocols, and/or formatting associated with the presentation of pre-flight briefing information. For example, data related to temperature or weather might be conveyed using specific color coding, symbology, and/or nomenclature schemes, and those schemes may vary from one country or geographic region to another. Consequently, the manner in which the pre-flight briefing information is presented could be influenced or dictated by the user-specified geographic region.

After collecting any user-entered data, task 302 generates the pre-flight briefing request in an appropriate manner. Depending upon the particular implementation of the remote user device, the pre-flight briefing request may be generated as an email, a text message, a voice message, an HTML document (such as a user-filled webpage form), or the like. The remote user device sends the customized pre-flight briefing request to the server system for processing (task 304). In typical embodiments, the request is transmitted from the remote user device to the server system using at least one data communication network.

This description of the process 300 assumes that the server system successfully receives the request that originated from the remote user device (task 306). Upon receipt of the pre-flight briefing request, the server system processes the request at an appropriate time and in an appropriate manner to identify or determine the data source(s) from which to retrieve the pre-flight briefing data (task 308). For example, the server system might parse and analyze the request, and create separate queries for each different data source (if applicable). These queries are used to interrogate at least one data source to obtain pre-flight briefing data from the interrogated data source(s) (task 310). In typical embodiments, the queries are sent from the server system to the respective data sources using at least one data communication network. This description of the process 300 assumes that the data sources successfully receive the queries for the pre-flight briefing data. In response to a query, each interrogated data source collects, generates, and/or compiles its requested pre-flight briefing data (task 312). Notably, task 312 could be performed in parallel any number of times for a plurality of different data sources. The data sources provide the requested pre-flight briefing data to the server system (task 314), using at least one data communication network.

This description of the process 300 assumes that the server system successfully obtains the requested pre-flight briefing data from the data sources (task 316). Ideally, the obtained pre-flight briefing data will satisfy all requirements of the customized pre-flight briefing request. As mentioned above with reference to FIG. 1 and the data sources 106, the pre-flight briefing data as provided by the data sources may be in a raw, encoded, symbolic, or otherwise difficult to understand format. Accordingly, the server system processes the obtained pre-flight briefing data to transform it into a different format that is easy to understand, interpret, and comprehend by humans (task 318). In this regard, the server system may convert the original pre-flight briefing data into an audio, visual, and/or text based format using traditional language syntax and context. More specifically, task 318 processes the pre-flight briefing data in accordance with one or more of the user-specified parameters that were conveyed in the pre-flight briefing request (e.g., the user-specified presentation format, the user-specified language, and/or the user-specified geographic region). Task 318 results in processed pre-flight briefing data that is customized or otherwise influenced by the user-specified parameters.

The server system continues by generating at least one presentation file from the processed pre-flight briefing data (task 320). As used here, a "presentation file" may be, without limitation: a document; an image; an executable file; a digital media audio clip; a digital media video clip; a graphical representation (such as a table, a chart, a map, a weather report, etc.); a text message; an email; a voicemail; or the like. In certain embodiments, the presentation files will be suitably configured, arranged, and formatted for compatibility with the native processing, display, rendering, and presentation capabilities of the requesting remote user device. The server system can then provide the presentation file(s) to the remote user device in an appropriate manner, depending upon the type and format of the presentation file(s), the configuration and capabilities of the remote user device, and the type of data communication link maintained between the server system and the remote user device. For example, the server system may transmit or stream (wirelessly and/or using tangible links) the presentation file(s) to the remote user device at an appropriate time (task 322), via at least one data communication network.

This description of the process 300 assumes that the remote user device successfully receives the presentation file(s) from the server system (task 324). Thus, the remote user device receives at least one presentation file in response to the previously sent pre-flight briefing request (see task 304). As explained above, the presentation file(s) will convey at least some content that is influenced by the user-specified presentation format, the user-specified language, and/or the user-specified geographic region. Upon receipt of the presentation file(s), the remote user device processes and handles the presentation file(s) in an appropriate manner. For example, the remote user device might display, render, execute, print, and/or playback the presentation file(s) for the user (task 326). In this regard, if a presentation file conveys text in the user-specified language, then task 326 may be associated with the displaying of the text on a display of the remote user device and/or the local conversion of the text into speech at the remote user device. If a presentation file conveys audio content in the user-specified language, then task 326 may generate sound corresponding to the audio content, using an audio element (e.g., a speaker or transducer) of the remote user device. In certain embodiments, a presentation file might convey visual content that is influenced by the user-specified geographic region. In such embodiments, task 326 may be associated with the displaying of the visual content on a display of the remote user device. Notably, the pre-flight briefing information is presented to the user in an intuitive and easy to understand manner that significantly reduces (or completely eliminates) the amount of outside assistance required to complete the pre-flight briefing. In other words, the process 300 can be performed such that the user need not rely on any human experts or reference materials to fully understand the pre-flight briefing information.

Referring again to task 318, the server system processes the raw or encoded pre-flight briefing data in a manner that is influenced or determined by one or more user-specified parameters. In practice, task 318 may be associated with processing related to language translation, text-to-audio conversion, text-to-graphics conversion, image rendering, video rendering, or the like. The specific type of processing performed during task 318 may depend on the contents of the pre-flight briefing request, the amount and formatting of the raw or encoded pre-flight briefing data, the configuration of the remote user device, and possibly other factors. In certain implementations, task 318 is associated with the converting of at least some of the pre-flight briefing data into a text format that is based upon the user-specified language. Thus, if the user designated French as the preferred language, then task 318 would generate text in the French language. Similarly, task 318 could be utilized to convert at least some of the pre-flight briefing data into an audio format that is based upon the user-specified language. Thus, if the user specified Japanese as a preferred language, then task 318 would generate audio content that uses the Japanese language for playback. Likewise, task 318 could be employed to convert at least some of the pre-flight briefing data into a video format having audio content that is based upon the user-specified language. As another example, task 318 may be performed to convert at least some of the pre-flight briefing data into a graphical or visual representation or format, where at least some of the visual content is influenced by the user-specified geographic region. Thus, if the user indicated Europe as the user-specified geographic region, then task 318 might generate graphical content (e.g., weather charts, flight plan diagrams, etc.) using color coding, symbology, and/or other visual cues that are standardized or typically used in Europe (whether or not they are also used elsewhere).

Figure 4:
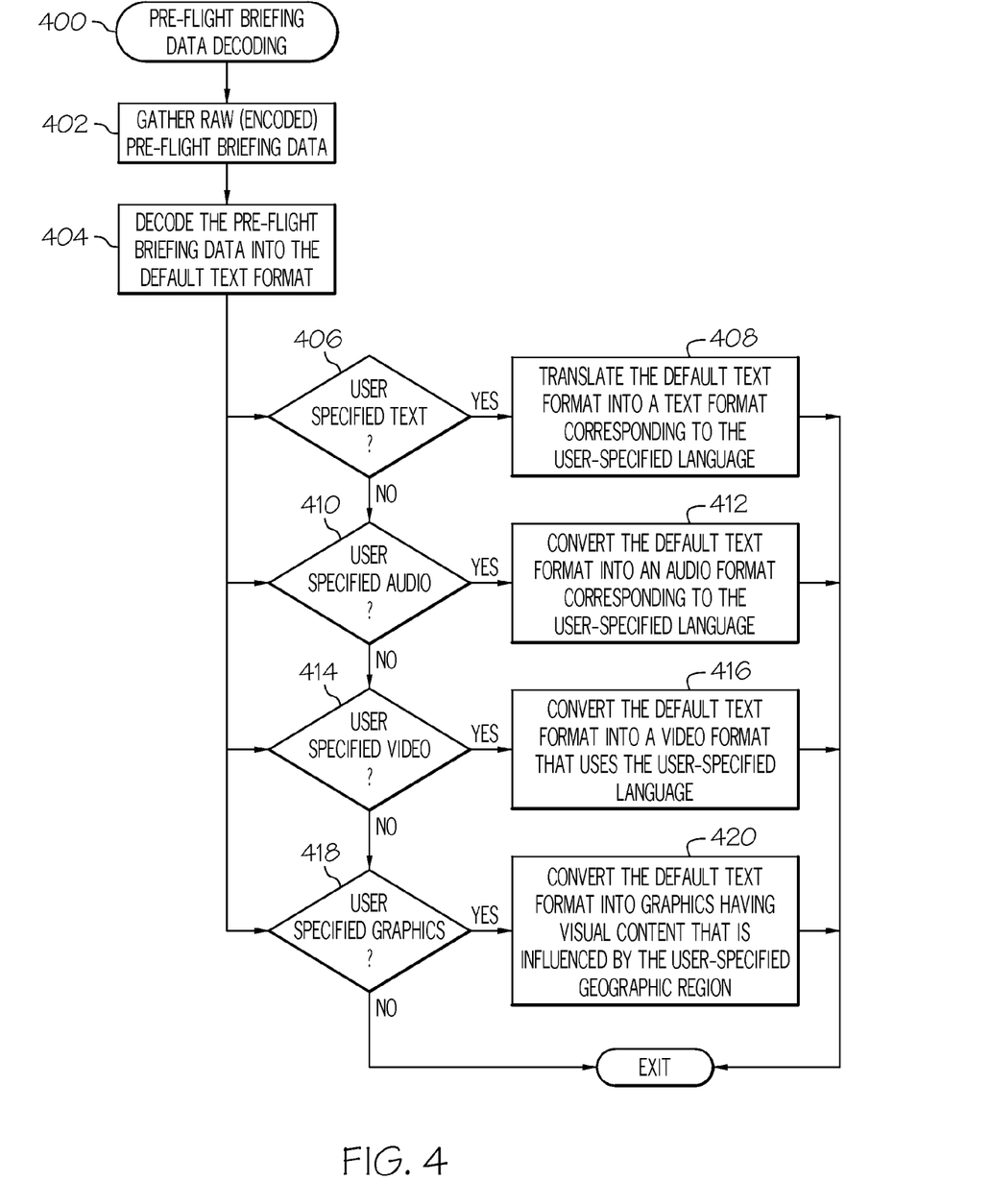
FIG. 4 is a flow chart that illustrates an exemplary embodiment of a pre-flight briefing data decoding process.

FIG. 4 is a flow chart that illustrates an exemplary embodiment of a pre-flight briefing data decoding process 400, which may be performed by a data processing and server system. Indeed, process 400 could be performed as a sub-process during the process 300 described above. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system. It should be appreciated that process 400 may include any number of additional or alternative tasks, the tasks shown in FIG.

4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

The process 400 may begin by gathering any raw (encoded) pre-flight briefing data (task 402), and then decoding or transforming at least some of the gathered data into a default text format (task 404). In practice, the decoded data, which is in the default text format, may need to be subjected to further translation, transformation, and/or conversion, particularly if the user-specified language differs from the language used for the default text format. In this regard, the illustrated embodiment of the process 300 carries out different tasks that depend on the user-specified parameters. For example, if the user-specified presentation format indicates that the pre-flight briefing information should be conveyed in a text format (query task 406), then the process 300 may need to translate the default text format into a different text format that corresponds to the user-specified language (task 408). If the user-specified presentation format indicates that the pre-flight briefing information should be conveyed in an audio format (query task 410), then the process 300 converts the default text format into an audio format that corresponds to the user-specified language (task 412). In other words, the default text information is converted into an audio representation in the user-specified language. In certain embodiments, the server system utilizes a text-to-speech synthesizer to generate the audio content.

If the user-specified presentation format indicates that the pre-flight briefing information should be conveyed in a video format (query task 414), then the process 300 converts the default text format into a video format (task 416). The video representation may include audio content that corresponds to the user-specified language. In other words, the audio portion of the video will be presented in the user-specified language. If the user-specified presentation format indicates that the pre-flight briefing information should be conveyed using one or more graphical representations (query task 418), then the process 300 converts the default text format into at least one graphical representation having visual content that is influenced by the user-specified geographic region, as described above. In certain embodiments, graphics may be used to convey weather data, flight plan information, airport layout information, aircraft weight and balance data, and the like.

FIG. 4 depicts four branches in parallel because the process 400 could concurrently support multiple presentation formats. After the desired translations, conversions, transformations, and/or reformatting have been performed, the process 400 may exit. Referring again to FIG. 3, the process 400 could exit in a manner that leads to task 320. At that time, the process 300 can continue with the generation of the at least one presentation file, as described in detail above.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automated method of providing pre-flight briefing information to a remote user device, the method comprising:
    receiving, from the remote user device via a data communication network, a customized pre-flight briefing request that includes a user-specified presentation format, a user-specified language, and a user-specified geographic region;
    in response to receiving the customized pre-flight briefing request, interrogating at least one data source to obtain pre-flight briefing data;
    processing the pre-flight briefing data in accordance with the user-specified presentation format, the user-specified language, and the user-specified geographic region, resulting in processed pre-flight briefing data, wherein processing the pre-flight briefing data comprises:
        decoding at least some of the pre-flight briefing data into a first text format; and
        translating the first text format into a second text format corresponding to the user-specified language;
    generating at least one presentation file from the processed pre-flight briefing data; and
    providing the at least one presentation file to the remote user device.

2. The method of claim 1, wherein providing the at least one presentation file comprises transmitting the at least one presentation file to the remote user device via the data communication network.

3. The method of claim 2, further comprising executing the at least one presentation file at the remote user device.

4. The method of claim 1, wherein providing the at least one presentation file comprises streaming the at least one presentation file to the remote user device via the data communication network.

5. The method of claim 1, wherein processing the pre-flight briefing data comprises converting at least some of the pre-flight briefing data into a text format that is based upon the user-specified language.

6. The method of claim 1, wherein processing the pre-flight briefing data comprises converting at least some of the pre-flight briefing data into an audio format that is based upon the user-specified language.

7. The method of claim 1, wherein processing the pre-flight briefing data comprises converting at least some of the pre-flight briefing data into a graphical representation.

8. The method of claim 7, wherein at least some visual content of the graphical representation is influenced by the user-specified geographic region.

9. The method of claim 1, wherein processing the pre-flight briefing data comprises converting at least some of the pre-flight briefing data into a video format having audio content that is based upon the user-specified language.

10. The method of claim 1, wherein processing the pre-flight briefing data comprises:
    decoding at least some of the pre-flight briefing data into a text format; and
    converting the text format into an audio format corresponding to the user-specified language.

11. The method of claim 1, wherein processing the pre-flight briefing data comprises:
    decoding at least some of the pre-flight briefing data into a text format; and
    converting the text format into a graphical representation having visual content that is influenced by the user-specified geographic region.

12. The method of claim 1, wherein processing the pre-flight briefing data comprises:
    decoding at least some of the pre-flight briefing data into a text format; and
    converting the text format into a video format having audio content that corresponds to the user-specified language.

13. An automated method of providing pre-flight briefing information at a remote user device, the method comprising:
    generating, with the remote user device, a customized pre-flight briefing request that includes a user-specified presentation format, a user-specified language, and a user-specified geographic region;
    sending the customized pre-flight briefing request to a data processing system that processes the customized pre-flight briefing request and obtains pre-flight briefing data that satisfies the customized pre-flight briefing request;
    receiving from the data processing center, in response to sending the customized pre-flight briefing request, at least one presentation file generated from the pre-flight briefing data, the at least one presentation file conveying content that is influenced by the user-specified presentation format, the user-specified language, and the user-specified geographic region, wherein the at least one presentation file conveys text in the user-specified language, and the method further comprises displaying the text on a display of the remote user device.

14. The method of claim 13, wherein:
    the at least one presentation file conveys audio content in the user-specified language; and
    the method further comprises generating sound corresponding to the audio content, using an audio element of the remote user device.

15. The method of claim 13, wherein:
    the at least one presentation file conveys visual content that is influenced by the user-specified geographic region; and
    the method further comprises displaying the visual content on a display of the remote user device.

16. A system that provides pre-flight briefing information to a remote user device, the system comprising:
    a user device interface configured to receive, from the remote user device, a customized pre-flight briefing request that includes a user-specified presentation format, a user-specified language, and a user-specified geographic region;
    a data source interface configured to communicate with at least one source of pre-flight briefing data to obtain pre-flight briefing data in accordance with the customized pre-flight briefing request; and
    a processor coupled to the user device interface and to the data source interface, the processor configured to generate at least one presentation file from the pre-flight briefing data, in a manner that is influenced by the user-specified presentation format, the user-specified language, and the user-specified geographic region;
    wherein the pre-flight briefing data comprises: flight plan data equal time point (ETP) data extended range twin engine operational performance standards (ETOPS) data alternate route data weather data weather charts; graphical weather information; airport location data airport layout data navigational aid (NAVAID) data aircraft weight data aircraft balance data runway analysis data notice to airmen (NOTAM) data drift down data ozone compliance data temporary flight restriction (TFR) data and receiver autonomous integrity monitoring (RAIM) prediction data.

17. The system of claim 16, wherein the user device interface is configured to communicate the at least one presentation file to the remote user device.

* * * * *